US011374337B2

(12) United States Patent
Mammeri et al.

(10) Patent No.: US 11,374,337 B2
(45) Date of Patent: Jun. 28, 2022

(54) INSULATOR FOR A CABLE END

(71) Applicant: SILEC CABLE, Montereau Fault Yonne (FR)

(72) Inventors: Mohamed Mammeri, Paron (FR); Abdou-Karim Top, Ecuelles (FR); Yanis Corlu, Montereau Fault Yonne (FR); Michel Taboulot, Montereau Fault Yonne (FR)

( * ) Notice: Subject to any disclaimer, the term of this patent is extended or adjusted under 35 U.S.C. 154(b) by 102 days.

(21) Appl. No.: 16/396,240

(22) Filed: Apr. 26, 2019

(65) Prior Publication Data

US 2019/0334256 A1 Oct. 31, 2019

(30) Foreign Application Priority Data

Apr. 27, 2018 (FR) ...................................... 1853756

(51) Int. Cl.
*H02G 15/064* (2006.01)
*H01R 4/22* (2006.01)
*H01R 13/52* (2006.01)
*H02G 15/04* (2006.01)

(52) U.S. Cl.
CPC ........... *H01R 4/22* (2013.01); *H01R 13/5205* (2013.01); *H02G 15/043* (2013.01)

(58) Field of Classification Search
CPC ........................... H01G 15/184; H02G 15/064
USPC ...................................................... 174/73.1
See application file for complete search history.

(56) References Cited

U.S. PATENT DOCUMENTS

| | | | | |
|---|---|---|---|---|
| 3,539,706 A | * | 11/1970 | Buroni | H02G 15/064 |
| | | | | 174/75 D |
| 4,952,174 A | * | 8/1990 | Sucht | H01R 9/05 |
| | | | | 439/584 |
| 5,206,780 A | * | 4/1993 | Varreng | H02G 15/06 |
| | | | | 361/117 |
| 5,280,136 A | | 1/1994 | Yaworski et al. | |
| 6,265,663 B1 | * | 7/2001 | Cicogna | H02G 15/06 |
| | | | | 174/73.1 |
| 7,074,087 B2 | * | 7/2006 | Szczesny | H01R 9/032 |
| | | | | 439/607.41 |
| 7,160,156 B2 | * | 1/2007 | Holliday | H01R 4/5025 |
| | | | | 439/585 |
| 7,527,524 B1 | * | 5/2009 | Coleman | H01R 9/0521 |
| | | | | 439/578 |
| 8,399,766 B2 | * | 3/2013 | Hane | H01R 13/53 |
| | | | | 174/84 R |

(Continued)

FOREIGN PATENT DOCUMENTS

| | | |
|---|---|---|
| DE | 10 2014 119 116 A1 | 6/2016 |
| EP | 0 429 734 A1 | 6/1991 |
| JP | 2012-75266 A | 4/2012 |

OTHER PUBLICATIONS

French Office Action dated Dec. 12, 2018 for French Application No. 1853756, 2 pages.

*Primary Examiner* — Chau N Nguyen
(74) *Attorney, Agent, or Firm* — Seed IP Law Group LLP (57) ABSTRACT

The disclosure provides an insulator for an end of a cable, the insulator having a longitudinal body in which a central channel is provided, the insulator including a connector system arranged in the central channel, the system comprising a connection pin for receiving an end segment of the cable, the pin being shaped so as to present an inside surface that is serrated.

11 Claims, 4 Drawing Sheets

(56) References Cited

U.S. PATENT DOCUMENTS

| | | | | |
|---|---|---|---|---|
| 8,785,780 B2 * | 7/2014 | Gaubert | ............... | H02G 15/068 |
| | | | | 174/74 A |
| 8,889,980 B2 * | 11/2014 | Carroll | ................ | H01L 31/1884 |
| | | | | 136/256 |
| 10,651,593 B2 * | 5/2020 | Wu | .................... | H01R 13/6277 |
| 2009/0283293 A1 * | 11/2009 | Hiner | ....................... | H01R 4/22 |
| | | | | 174/87 |

* cited by examiner

INSULATOR FOR A CABLE END

BACKGROUND

Technical Field

The disclosure relates to an insulator for a cable end.

Description of the Related Art

In the field of transporting electricity, it is known to fit the end of the cable with an insulator, in particular in order to enable it to be joined with an end of another cable. The body of the insulator generally presents a central channel having a connector system arranged therein, with the end segment of the cable in question being received in the connector system.

Such an insulator is found to be particularly useful for cables that transport electricity at high or medium voltage.

Nevertheless, it can happen that the connector system is subjected to very high electrical and thermal stresses, given the voltages associated with the cable. Thus, in the event of a voltage surge, the connector system can be damaged.

BRIEF SUMMARY

The disclosure provides an insulator for an end of a cable that is less sensitive to the thermal and electrical stresses that are imposed thereon.

The disclosure thus provides an insulator for an end of a cable, the insulator having a longitudinal body in which a central channel is provided, the insulator including a connector system arranged in the central channel, the system comprising a connection pin for receiving an end segment of the cable, the pin being shaped so as to present an inside surface that is serrated.

The serrated inside surface, e.g., the surface that is in contact with the end segment of the cable, enables a very good connection to be ensured between the end segment and the connection pin, while limiting damage to the connection pin, in particular in the event of a voltage surge in the end of the cable.

Optionally, the connection pin is a single-piece solid.

Optionally, the connection pin includes at least one slot.

Optionally, the connection pin is made of a metal material based on silver-plated copper.

Optionally, the system includes two jaws surrounding the connection pin in order to clamp it between them.

Optionally, the system further comprises a bushing mounted on the connection pin.

Optionally, the bushing includes contact blades at least on its inside surface.

Optionally, the system includes a clamping shell that covers at least the connection pin.

Furthermore, the disclosure provides an insulator for an end of a cable, the insulator having a composite electrically-insulating longitudinal body comprising:

an inner layer in which there is provided a central channel within which there is received a connector system of the insulator for connection to the end of the cable, the inner layer being made of a material formed from a composition comprising an epoxy resin and a hardener; and an outer layer covering the inner layer, the outer layer being made of a material formed from a composition comprising a silicone.

Thus, associating an inner layer based on epoxy resin and on hardener with an outer layer based on silicone makes it possible to obtain a body presenting very good electrical insulation while enabling the insulator to be "dry".

In addition, the disclosure provides an insulator for an end of a cable, the insulator having an electrically-insulating longitudinal body in which there is received a connector system of the insulator for connection to the cable end, the insulator comprising a compression system comprising a flange for holding a pusher against the connector system.

This serves to improve the quality of the connection between the cable and the insulator.

Other characteristics and advantages of the disclosure appear on reading the following description of a particular, non-limiting embodiment of the disclosure.

BRIEF DESCRIPTION OF THE SEVERAL VIEWS OF THE DRAWINGS

The disclosure can be better understood in the light of the following description given with reference to the accompanying figures, in which.

DETAILED DESCRIPTION

With reference to the various figures, in a particular embodiment of the disclosure, the cable end insulator, given overall reference 1, is associated as shown with a cable C for transporting electricity at high voltage, e.g., specifically a voltage greater than or equal to 72.5 kilovolts (kV).

Figure 1:
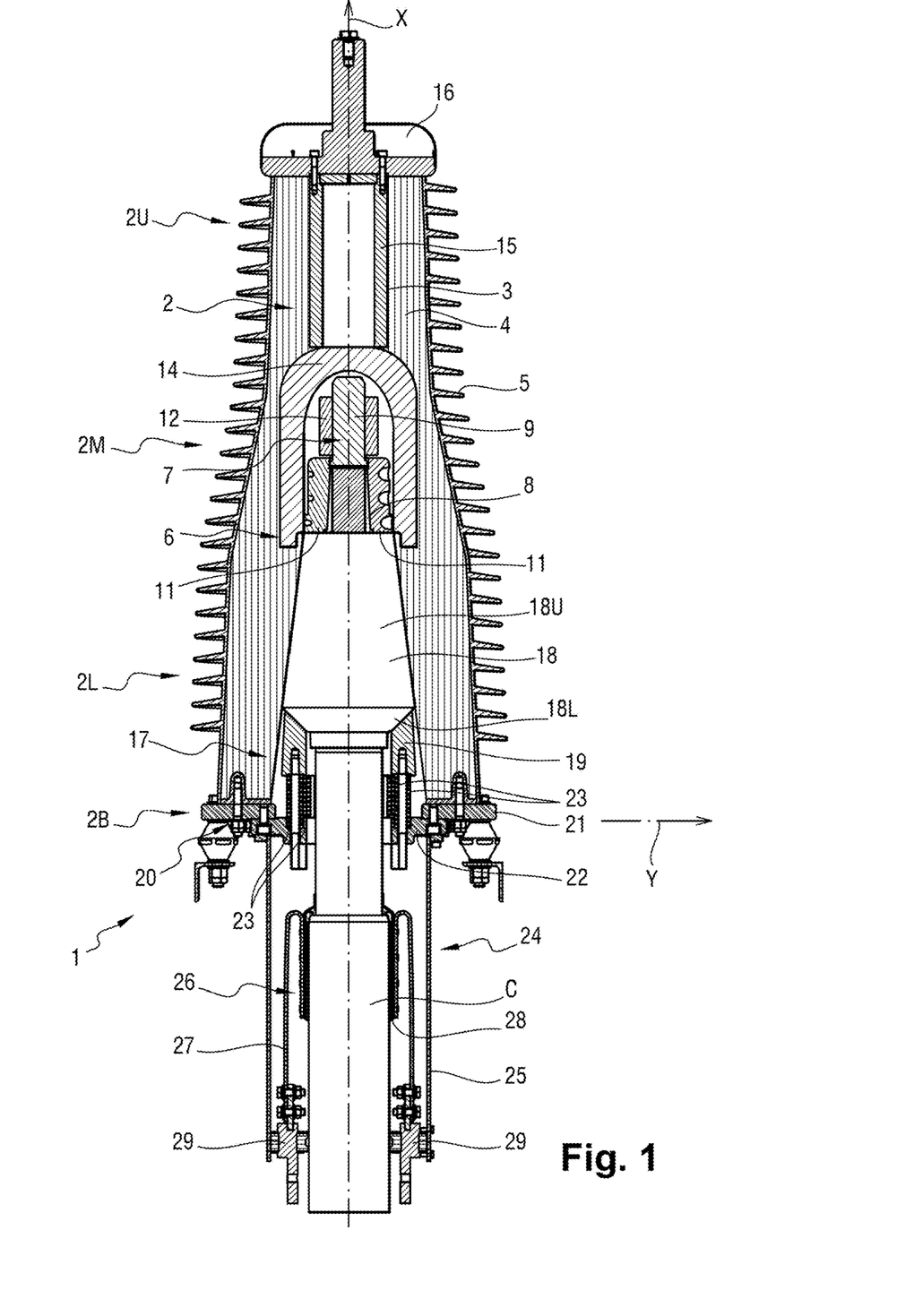
FIG. 1 is a longitudinal section view of an insulator in a particular embodiment of the disclosure.

In an embodiment, the insulator 1 thus forms a dry self-supporting outside end for a high voltage cable C, such as a 100 kV dry self-supporting outside end.

The insulator 1 thus complies with an "eco-design" environment.

This example application is not limiting and the insulator 1 could be used with other types of cables. For example, the insulation 1 could form an outside end of a 90 kV self-supporting cable.

Body of the Insulator

The insulator 1 comprises a longitudinal body 2 made of an electrically insulating material that extends along a first axis X. The body 2 is a solid body of revolution about the first axis X.

The body 2 comprises a frustoconical top segment 2U, a frustoconical intermediate segment 2M of a slope greater than that of the top segment 2U, and a frustoconical bottom segment 2L of a slope smaller than that of the intermediate segment 2M, but greater than that of the top segment 2U. The body 2 flares progressively from its top end to its bottom end.

A central channel 3 is provided in the body 2 so as to extend along the first axis X and open out at both the top and bottom ends of the body 2. The channel 3 is thus coaxial with the body 2.

The channel 3 is, in an embodiment, a hollow space that forms a solid of revolution about the first axis X. In an embodiment, the channel 3 has a straight cylindrical top segment, a straight cylindrical intermediate segment, and a frustoconical bottom segment, the channel 3 flaring progressively from its top end to its bottom end.

In an embodiment, the body 2 is made up of two layers, each of which is electrically insulating: an inner layer 4 within which the channel 3 is formed, and an outer layer 5 covering the inner layer 4. The body 2 is thus referred to as "composite".

The inner layer 4 is made of a material formed from a first composition comprising a castable resin system made up of an epoxy resin and a hardener.

The outer layer 5 is made of a material formed from a second composition comprising at least one silicone.

In an embodiment, the outer layer 5 is shaped so as to present a succession of sheds at different heights, each shed surrounding the body 1 circumferentially. Each shed thus slopes towards the bottom end of the body 2 so as to lengthen the creepage distances of the insulator 1. The sheds extend over the entire height (parallel to the first axis X) of the body 2, with the distance between two successive sheds being the same over the entire height of the body 2.

By way of example, the outer layer 5 is obtained by molding.

Associating an inner layer 4 based on epoxy resin and a hardener with an outer layer 5 based on silicone makes it possible to obtain a body 2 that presents very good electrical insulation while making it possible to obtain an insulator 1 that is the to be "dry", i.e., that does not contain gas, liquid, or semi-liquid in order to provide electrical insulation. The insulator 1 thus complies better with environmental standards.

Connector System of the Insulator

Figure 2:
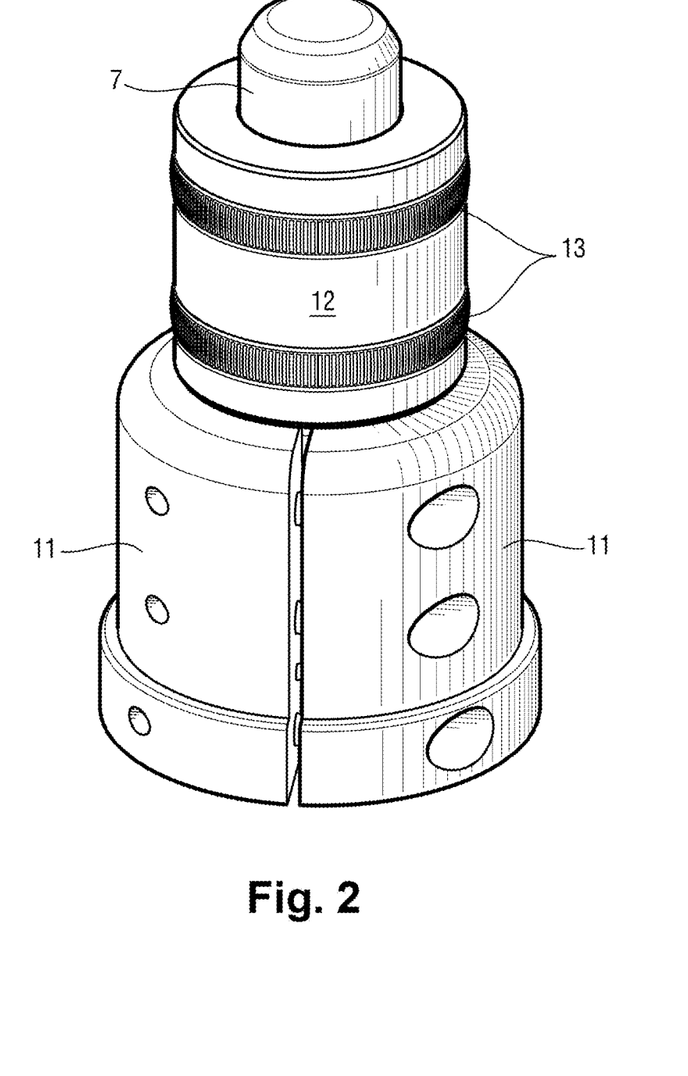
FIG. 2 is a three-dimensional view of a portion of a connector system of the insulator shown in FIG. 1.

The insulator 1 also has a connector system 6 comprising a connection assembly including a connection pin 7 that receives the end segment of the cable C.

The connection pin 7 is arranged in the channel 3 in the intermediate segment of the channel 3 that is adjacent to the intermediate segment 2M and in the intermediate segment 2M of the body 2. The connection pin 7 thus extends in the channel 3 along the first axis X so as to lie on the first axis X.

Figure 3:
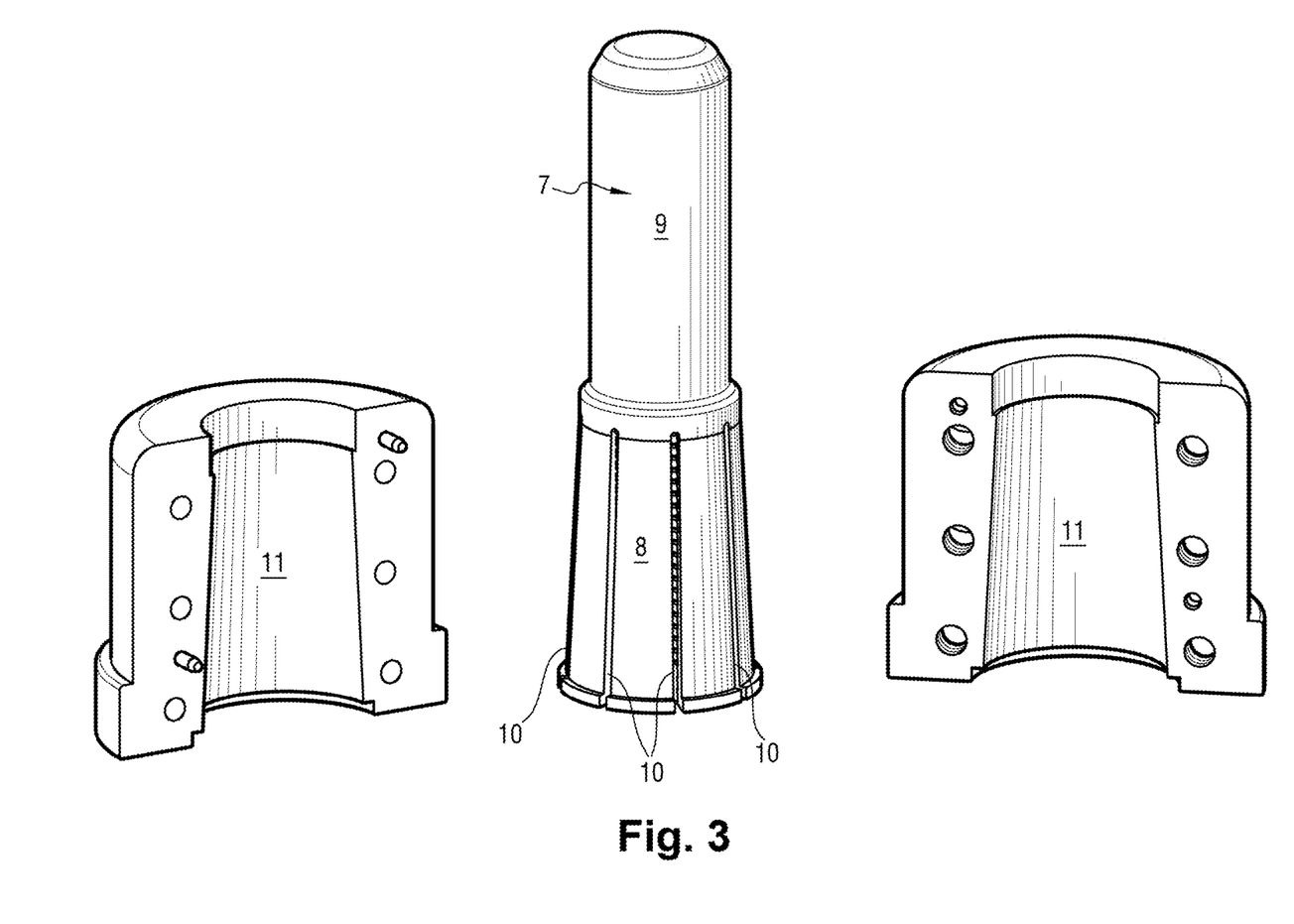
FIG. 3 is an exploded three-dimensional view of a connection pin and of two jaws of the connector system shown in FIG. 2.

In an embodiment, the connection pin 7 is a single-piece solid.

This makes it possible to improve the quality of the connection between the cable C and the insulator 1.

In particular manner, the connection pin 7 is a solid of revolution about the first axis X. The connection pin 7 has a bottom portion 8 for receiving the end segment and it is extended by a top portion 9. In an embodiment, both of the portions 8 and 9 are constituted by straight cylinders, with both of the portions 8 and 9 presenting substantially equal diameters.

In an embodiment, the bottom portion 8 is split. In an embodiment, the bottom portion 8 presents a plurality of slots 10 each extending over substantially the full height (parallel to the first axis X) of the bottom portion 8. In an embodiment, the slots 10 extend so as to open out at the bottom end of the bottom portion 8. The various slots are also arranged in regular manner around the entire circumference of the bottom portion 8.

This enables the end segment to be well received in the connection pin 7, even if the end segment is somewhat deformed.

In addition, the inside surface of the bottom portion 8, i.e., the surface that is in contact with the end segment, is serrated.

This serrating serves to limit the appearance of unwanted alumina in the connection pin 7. The term "serrated" is used herein to mean any modification of the inside surface that interrupts the smoothness of the inside surface. Serrations of any shape may be used to modify the smoothness of the inside surface.

In a particular embodiment, the inside surface of the bottom portion 8 is thus provided with grooves that serrate the inside surface.

In an embodiment, the entire inside surface of the connection pin 7 is serrated, and thus presents grooves that are spaced apart uniformly. The distance between two consecutive grooves may for example lie in the range from about 3 millimeters (mm) to about 4 mm.

The surface of the connection pin is in an embodiment treated, in full or in part, with a deposit of a layer of silver having a thickness of about 5 micrometers ($\mu$m) to about 10 $\mu$m in order to limit the formation of alumina and to ensure a good thermal and electrical transition, e.g., by surface treatment of the connection pin 7.

This serves to further improve the quality of the connection.

The connection pin 7 is, in an embodiment, made of a metal material such as a material based on aluminum, on copper, on silver-plated copper, Or other suitable metal materials. By way of example, the pin 7 is made of Cu Al alloy.

In order to further improve the connection, the connection assembly has two jaws 11 clamped on the connection pin.

This enables the end segment to be held securely in the connection pin 7, even if the end segment is somewhat deformed.

The at least two jaws 11, two are shown as an illustrative example, are arranged in the channel 3 in the intermediate segment of the channel 3 and in the intermediate segment 2M of the body 2.

The two jaws 11 are also arranged so as to surround the connection pin 7, at least over the bottom portion 8 of the pin 7. In an embodiment, the two jaws 11 are arranged in such a manner as to extend over the full height of the bottom portion 8 and over a fraction of the top portion 9 of the connection pin 7 that is proximal to the bottom portion 8.

The two jaws 11 are secured to each other (e.g., by screws) so that together they substantially form a solid of revolution about the first axis X. The solid is substantially concentric with the connection pin 7.

Since the jaws 11 are similar to one another, only one of them is described herein, the description applying likewise to the other jaw 11.

Each jaw 11 is a single-piece solid.

In an embodiment, the jaw 11 is shaped as a hollow half-cylinder about the first axis X. In an embodiment, the jaw 11 is shaped so as to flare both on the outside and on the inside respective conical surfaces towards the bottom end of the jaw 11. The jaw 11 is substantially in the shape of a half-cone.

The jaw 11 is, in an embodiment, made of a metal material, e.g., a material based on copper, zinc, or other suitable metal materials. The jaw 11 is in an embodiment made of brass.

Figure 4:
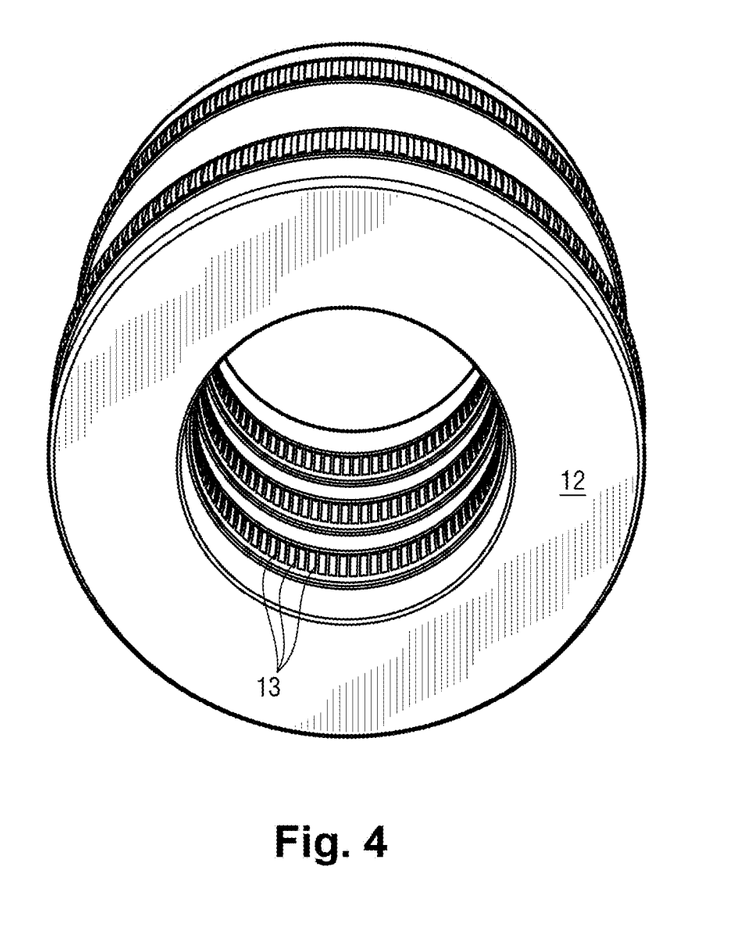
FIG. 4 is a three-dimensional view of a bushing of the connector system shown in FIG. 2.

In order to further improve the connection, the connection assembly includes a bushing 12 mounted on the connection pin.

This enables the end segment to be well held in the connection pin, even if the end segment is somewhat deformed.

In an embodiment, the bushing 12 is arranged in the channel 3 in the intermediate segment of the channel 3 and in the intermediate segment 2M of the body 2.

The bushing 12 is also mounted on the top portion 9 of the connection pin 7 so as to rest via its bottom end on the two jaws 11. The bushing 12 is also arranged in an embodiment so as to extend over a portion only of the height of the top portion 9 of the connection pin 7, the bushing 12 presenting a height that is less than the top portion 9.

The bushing 12 is, in an embodiment, a single-piece solid. In an embodiment, the bushing 12 is shaped substantially as a solid of revolution about the first axis X. The bushing 12 is thus coaxial with the connection pin 7.

The bushing 12 is, in an embodiment, shaped as a straight cylinder.

The bushing 12 is, in an embodiment, made of a metal material, e.g., based on aluminum, on copper, on brass, on silver-plated brass, or other suitable metal materials. The bushing 12 is in an embodiment made of silver-plated brass.

Like the connection pin, the surface of the bushing may be treated (in full or in part) by depositing a layer of silver having a thickness 5 µm to 10 µm in order to limit the formation of alumina and to ensure a good thermal and electrical transition.

In an embodiment, the bushing 12 has contact blades 13, only some of which are referenced herein, on one or more of its outside surface or its inside surface in order to come into contact with a clamping shell 14 that is described herein or with the connection pin 7, respectively. In an embodiment, the bushing 12 has contact blades 13 both on its outside surface and also on its inside surface.

In an embodiment, the bushing 12 is thus shaped so that its inside surface is in contact with the outside surface of the top portion 9 of the connection pin 7 via these contact blades 13 only.

This improves the connection between the connection pin 7 and the insulator 1.

In an embodiment, the contact blades 13 are arranged on the bushing 12 so that together they form at least one circle that is coaxial with the bushing 12. In an embodiment, the contact blades 13 are arranged so as to form at least two circles on the inside surface and/or at least two circles on the outside surface, all of which circles are coaxial with the bushing 12. If the bushing 12 has circles on both surfaces, the circles on the outside surface may be on the same levels as the circles on the inside surface, or they may be on different levels.

Each contact blade 13 is also arranged on the bushing 12 so as to extend individually parallel with the first axis X.

In an embodiment, each contact blade 13 is a single-piece solid. Each contact blade 13 is, in an embodiment, made of a metal material, e.g., based on copper, on beryllium copper . . . . Each contact blade 13 is in an embodiment based on beryllium copper.

Each contact blade 13 is elastically deformable. For this purpose, each contact blade 13 is of very small thickness, in an embodiment, in an embodiment, lying in the range 0.15 mm to 0.5 mm.

The various contact blades 13 are in an embodiment all identical.

In an embodiment, the contact blades 13 are fitted onto the bushing 12. For example, grooves may be made in the bushing 12 in order to receive the contact blades.

The connector assembly also includes a clamping shell 14 that covers the bushings 12, the connection pin 7, and the two jaws 11, so as to press those various components firmly together.

In an embodiment, the shell 14 is arranged in the channel 3 in the intermediate segment of the channel 3 and in the top segment of the channel 3 that is adjacent to the top segment 2U of the body 2, and also in the intermediate segment 2M of the body 2 and the top segment 2U of the body 2.

The shell 14 is also arranged in the connection assembly so as to surround the connection pin 7, the bushing 12, and the two jaws 11. The shell 14 is also arranged in an embodiment so as to extend (parallel the first axis X) from above the connection pin 7 to below the two jaws 11.

The shell 14 is in an embodiment a single-piece solid. In an embodiment, the shell 14 in a shape of substantially a solid of revolution about the first axis X. The shell 14 is thus coaxial with the connection pin 7.

The shell 14 is, in an embodiment, made of a metal material, e.g., based on copper, on brass, on silver-plated brass, or other suitable metal materials. The shell 14 is in an embodiment based on silver-plated brass. Like the connection pin, the surface of the shell 14 may be treated (in full or in part) by depositing a layer of silver having a thickness of 5 µm to 10 µm in order to limit the formation of alumna and in order to ensure a good thermal and electrical transition.

By way of example, the shell 14 is made integrally with the body. The shell 14 is thus molded together with the body 2 during fabrication of the body 2, or else the body 2 is overmolded onto the shell 14 after it has already been made. Under such circumstances, and in an embodiment, the surface of the shell 14 may be treated (in full or in part) by sand-blasting prior to overmolding the body 2 in order to enhance the adhesion of the body on the shell 14.

In an embodiment, the shell 14 is in contact with the bushing 12 solely via the outside contact blades of the bushing 12. Furthermore, the connector system 6 includes a block 15 for connecting the connection assembly to the outside of the insulator 1, the block 15 being electrically conductive and extending from the outside of the insulator 1 to the shell 14 so as to rest on it.

The insulator 1 also includes a cap 16 closing the top end of the body 2, the cap 16 resting on the body 2 and having the block 15 extending through it in order to reach the outside.

In service, the end segment is arranged in the connection pin 7 and then the two jaws 11 are arranged around the connection pin 7 and clamped onto the connection pin 7. In some example scenarios, the two jaws 11 function to deform the connection pin 7 so that it fits as well as possible to the shape of the end segment.

The bushing 12 is then arranged on the connection pin 7 and then the bushing-and-pin assembly is mounted as a tight fit in the shell 14.

This provides a very good connection of the cable C to the insulator 1.

In addition, such a connector system 6 enables a connection to be made quickly between the end segment and the insulator 1. For example, in some applications, the end segment can thus be connected to the insulator 1 in less than one hour.

Such a connector system 6 also makes it possible to avoid using a press for crimping the connection pin 7 onto the end segment, thereby greatly facilitating assembly of the insulator 1 on the cable C.

Compression System of the Insulator

In order to provide a good connection between the end of the cable C and the insulator 1, the insulator 1 has a compression system 17 for compressing the connector system 6.

The compression system 17 thus comprises a pusher 18 resting against the bottom end of the connector system 6. The pusher 18 in an embodiment is generally in the shape of a cone so that the pusher 18 can also be referred to as a "stress cone".

In an embodiment, the pusher 18 is arranged in the channel 3 in the bottom segment of the channel 3 that is adjacent to the bottom segment 2L of the body 2, and also in the bottom segment 2L of the body 2.

The pusher 18 is in an embodiment a single-piece solid.

In an embodiment, the pusher 18 is substantially in the shape of a solid of revolution about the first axis X. The pusher 18 is thus on the same axis as the connection pin 7.

The pusher 18 has a frustoconical top portion 18U of substantially the same shape as the frustoconical bottom segment of the channel 3 in order to match its shape, and a frustoconical bottom portion 18L of a conical shape having a slope opposite to the slope of the top portion 18U. The bottom portion 18L of the pusher 18 therefore does not match the shape of the channel 3, thus enabling a slug 19 of the compression system 17 to be used at this point, as described herein.

The pusher 18 is also hollow so as to enable the end of the cable C to pass therethrough. The pusher 18 is also shaped so as to be carried in operation by the cable C. Thus, in operation, a pusher 18 is obtained that is clamped between the walls of the channel 3 and the cable C.

The pusher 18 is made of a material formed from a composition that comprises a silicone. In an embodiment, the pusher 18 is made of the same material as the outer layer 5 of the body 2.

The above-mentioned slug 19 is arranged in the channel 3 in the bottom segment of the channel 3 and in the bottom segment of the body 2. The slug 19 thus extends in the channel 3 along the first axis X so as to be coaxial about the first axis X (and thus on the same axis as the pusher 18).

The slug 19 is thus arranged in the channel 3 so as to rest against the bottom portion of the pusher 18, the slug 19 then being capable of pressing the pusher 18 towards the connection pin 7.

The frustoconical shape of the bottom portion 18L of the pusher 18 enables the pressure exerted by the slug 19 to be distributed over the pusher 18.

The slug 19 in an embodiment is a single-piece solid.

In particular manner, the slug 19 is a solid of revolution about the first axis X.

The slug 19 is, in an embodiment, shaped as a straight cylinder. Naturally, the slug 19 is ring-shaped so as to enable the cable C to pass therethrough so that the cable C can reach the connection pin 7.

In order to improve contact between the slug 19 and the pusher 18, the top face of the slug 19 is in an embodiment shaped to match the facing shape of the pusher 18. The top face in an embodiment thus slopes towards the center of the slug 19 in order to match the conical shape of the bottom portion 18L of the pusher 18.

By way of example, the slug 19 is made of a metal material such as a material based on aluminum.

The compression system 17 also has a flange 20 for holding the pusher 18.

In an embodiment, the flange 20 comprises an outer plate 21 and an inner plate 22 both co-operating to close the bottom end of the body 2, with the exception of an orifice enabling the end of the cable C to reach the connection pin 7.

In an embodiment, both plates 21 and 22 are single-piece solids.

The outer plate 21 is generally in the shape of an annulus that rests against the bottom end of the body 3. As a result, the outer plate 21 is coaxial about the first axis X.

In an embodiment, the outer plate 21 has dimensions that are substantially the same as or slightly larger than dimensions of a bottom face 2B of the body 2 in a direction Y that is orthogonal to the first axis X.

The outer plate 21 may for example be made of a metal material such as a material based on aluminum. The outer plate 21 is in an embodiment made of the same material as the slug 19.

The outer plate 21 is also secured to the body 2, directly via the bottom face 2B of the body 2, e.g., by screws.

In an embodiment, the inner plate 22 is generally in the shape of an annulus that rests at least in part against the bottom face of the outer plate 21. As a result, the inner plate 22 is coaxial about the first axis X.

The inner plate 22 is of smaller dimensions than the outer plate 21 in the direction Y so as to provide additional closure for the body 2, while allowing the end of the cable C to pass through.

By way of example, the inner plate 22 is made of a metal material such as a material based on aluminum. The outer plate is in an embodiment made of the same material as the slug 19.

The inner plate 22 is also secured to the body 2, directly via the bottom face of the outer plate 21, e.g., by screws. It is thus the outer plate 21 that carries the inner plate 22.

The slug 19 is in an embodiment secured to the flange 20 by springs 23. Each spring 23 extends parallel to the first axis X between the slug 19 and the flange 20 so that together the springs form a circle that is coaxial about the first axis X. One end of each spring 23 in an embodiment is fastened directly to the slug 19 and its other end is fastened directly to the inner plate 22.

As a result, the slug 19 is connected to the flange 20 solely via the circle of springs 23.

Within the circle, the various springs 23 are spaced apart from one another by substantially a same distance. By way of example, the circle comprises 10 to 18 springs.

The springs 23 are advantageously springs that tend to move the flange 20 away from the slug 19, thereby enabling the pusher 18 to be pressed continuously against the connector system 6. The springs 23 are, in an embodiment, compression springs.

This serves to improve the quality of the connection between the cable C and the insulator 1.

Advantageously, the compression system 17 is made up of elements that are simple in shape, and inexpensive to fabricate. Furthermore, the number of elements making up the compression system 17 remains limited (the two plates 21 and 22, the slug 19, the pusher 18, and the springs 23). In addition, the compression system 17 is relatively simple to assemble.

Protecting the Insulator

Extending the bottom end of the body 2, the insulator 1 includes protection 24 providing the insulator 1 with sealing.

The protection 24 comprises a sleeve 25 secured to the flange 20 so as to extend parallel to the first axis X. The sleeve 25 is coaxial about the first axis X (and thus lies on the same axis as the body 2). In an embodiment, the sleeve 25 presents an outside diameter that is substantially equal to the inside diameter of the outer plate 21. In an embodiment, the sleeve 25 is secured to both plates 21 and 22, e.g., by screws.

In an embodiment, the sleeve 25 is a single-piece solid.

In particular manner, the sleeve 25 is a solid of revolution about the first axis X. Naturally, the sleeve 25 is hollow so as to enable the cable C to pass through it in order to reach the connection pin 7. The sleeve 25 thus surrounds the cable C on the outside. The sleeve 25 is, in an embodiment, in the shape of a straight cylinder.

By way of example, the sleeve 25 is made of a metal material, such as a material based on aluminum.

The protection 24 also comprises a device 26 arranged between the cable C and the sleeve 25 in order to provide the insulator 1 with electrical protection (in particular in the event of a voltage overload).

In an embodiment, the device 26 comprises a braid 27 that is arranged between the bottom end of the sleeve 25 and a portion of the cable C that is arranged under the compression system.

In an embodiment, the braid 27 is arranged so as to be coaxial about the first axis X.

In particular manner, the braid 27 is a solid of revolution about the first axis X. The braid 27 thus surrounds the cable C on the outside. The braid 27 is, in an embodiment, shaped as a straight cylinder.

By way of example, the braid 27 is made of a metal material, such as a material based on tinned copper.

The top end of the braid 27 is, in an embodiment, turned inwards so that it is the inner rim of the braid 27 that is secured to the cable C.

In a particular embodiment, the rim is secured to the cable C by means of a ring 28. By way of example, the ring 28 is adhesively bonded to the cable C and the braid 27 is itself adhesively bonded to the ring 28. The ring 28 is, in an embodiment, made of a metal material, such as a material based on aluminum.

Furthermore, the bottom end of the braid 27 is straight and is secured both to the sleeve 25 and to the cable C by means of one or more bars 29 themselves secured both to the sleeve 25 and to the cable C.

By way of example, the bars 29 are made of a metal material such as a material based on copper.

This provides very good sealing for the insulator.

The disclosure is not limited to the embodiment described and variants may be applied thereto without going beyond the ambit of the disclosure as defined by the claims.

In particular, although the "insulator body" portion is described herein as dependent on the disclosure, the "insulator body" portion could be independent of the disclosure. It would thus be possible to have a prior art connector system associated with the "insulator body" as described.

Likewise, although the "compression system of the insulator" is described herein as dependent on the disclosure, the "compression system of the insulator" portion could be independent of the disclosure. It would thus be possible to have a prior art connector system associated with the "compression system of the insulator" as described.

Likewise, although the "insulator protection" portion is described herein as dependent on the disclosure, the "insulator protection portion" could be independent of the disclosure. It would thus be possible to have a prior art connector system associated with the "insulator protection" as described.

It is possible for the disclosure to be associated with a "compression system of the insulator" and/or an "insulator body" and/or an "insulator protection" of the prior art.

Although in an embodiment the inside surface of the connection pin is serrated by grooves, the inside surface of the connection pin could be separated in any other way. By way of example, the inside surface could thus be granular.

Although in an embodiment the insulator is associated with a high voltage electricity transport cable, the insulator could be associated with a cable of some other type, such as a medium voltage electricity transport cable.

Although in an embodiment, the contact blades are fitted on the bushing, the contact blades could be made integrally with the bushing.

The bushing need not have any contact blades on its inside surface and/or its outside surface. Under such circumstances, the bushing would nevertheless be in contact with the connection pin and/or the shell, but directly respectively via its inside surface and/or its outside surface.

The contact blades could be carried by the connection pin and/or the shell. Both the bushing and the connection pin and/or the bushing and the shell could carry contact blades that co-operate with one another in order to establish contact between the corresponding parts.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An insulator, comprising:
   a longitudinal body;
   a central channel within the longitudinal body;
   a connector system arranged in the central channel, the connector system including
      a connection pin for receiving an end segment of a cable, the connection pin including an inside surface that is serrated;
      a clamping shell that receives at least the connection pin;
      an electrically conductive block resting on the clamping shell; and
      a bushing mounted over the connection pin,
   wherein the connection pin is separated from the electrically conductive block by the clamping shell, wherein the bushing includes contact blades at least on its inside surface, wherein the connector system includes two or more jaws together surrounding the connection pin and configured to clamp the connection pin among them, and wherein the longitudinal body is a composite and includes: an inner layer in which the central channel is provided, the inner layer being made of a material formed from a composition including an epoxy resin and a hardener; and an outer layer covering the inner layer, the outer layer being made of a material formed from a composition including a silicone.

2. The insulator according to claim 1, wherein the connection pin is a mono-block.

3. The insulator according to claim 1, wherein the connection pin includes at least one slot.

4. The insulator according to claim 1, wherein the connection pin is made of a metal material based on copper.

5. The insulator according to claim 1, further comprising a compression system that includes a flange for holding a pusher against the connector system, the pusher being coupled to the end segment of the cable.

6. An insulator, comprising:
- a frustoconical hollow body having a first segment, a second segment and third segment, each of the first segment, the second segment and the third segment including an external frustoconical shape of a different slope;
- a connector system positioned within the frustoconical hollow body adjacent to the second segment, the connector system including:
  - a connection pin configured to receive a cable, the connection pin including a split portion that has a serrated inside surface;
  - a clamping shell configured to receive at least the connection pin;
  - an electrically conductive block resting on the clamping shell, wherein the connection pin is separated from the electrically conductive block by the clamping shell;
  - at least two jaws that are configured to be coupled together to surround the split portion of the connection pin; and
  - a bushing coaxially coupled to a portion of the connection pin other than the split portion; and
- a cone-shaped pusher positioned within the frustoconical hollow body adjacent to the third segment, the cone-shaped pusher including a hollow inner space to be coupled to the cable and an external frustoconical shape that fits into a hollow space within the third segment.

7. The insulator according to claim 6, wherein the cone-shaped pusher includes a first portion and a second portion, the first portion including the external frustoconical shape that fits into the hollow space within the third segment of the frustoconical hollow body, the second portion being spaced away from the third segment.

8. The insulator according to claim 7, further comprising a slug element configured to rest against the second portion of the cone-shaped pusher.

9. The insulator according to claim 8, further comprising a ring-shaped flange element arranged to push the slug element against the second portion of the cone-shaped pusher.

10. The insulator according to claim 9, wherein the ring-shaped flange element is positioned at least partially beyond the frustoconical hollow body.

11. An insulator, comprising:
- a frustoconical hollow body having a first segment, a second segment and third segment, each of the first segment, the second segment and the third segment including an external frustoconical shape of a different slope;
- a connector system positioned within the frustoconical hollow body adjacent to the second segment, the connector system including:
  - a connection pin configured to receive a cable, the connection pin including a split portion that has a serrated inside surface;
  - a clamping shell configured to receive at least the connection pin;
  - an electrically conductive block resting on the clamping shell; and
  - two or more jaws,
- wherein the connection pin is spaced apart from the electrically conductive block and the clamping shell, and wherein the two or more jaws surrounding the connection pin and configured to clamp the connection pin among them,
- a cone-shaped pusher positioned within the frustoconical hollow body adjacent to the third segment, the cone-shaped pusher including a hollow inner space to be coupled to the cable and an external frustoconical shape that fits into a hollow space within the third segment.

* * * * *